United States Patent
Sneddon et al.

(10) Patent No.: US 9,505,532 B2
(45) Date of Patent: Nov. 29, 2016

(54) PRESSURE-RELIEF VENT

(71) Applicant: Aerojet Rocketdyne, Inc., Sacramento, CA (US)

(72) Inventors: Kirk Sneddon, Sacramento, CA (US); Estelle Anselmo, Sacramento, CA (US)

(73) Assignee: AEROJET ROCKETDYNE, INC., Rancho Cordova, CA (US)

( * ) Notice: Subject to any disclaimer, the term of this patent is extended or adjusted under 35 U.S.C. 154(b) by 234 days.

(21) Appl. No.: 14/259,454

(22) Filed: Apr. 23, 2014

(65) Prior Publication Data

US 2015/0307242 A1 Oct. 29, 2015

(51) Int. Cl.
- *B65D 51/16* (2006.01)
- *F16K 17/38* (2006.01)
- *B65D 39/00* (2006.01)

(52) U.S. Cl.
CPC ....... *B65D 51/1633* (2013.01); *B65D 39/0005* (2013.01); *F16K 17/383* (2013.01)

(58) Field of Classification Search
CPC .......... B65D 51/1633; B65D 51/1644; B65D 51/16
USPC ......... 220/202, 203.01, 582, 367.1; 215/311, 215/307; 137/72, 74
See application file for complete search history.

(56) References Cited

U.S. PATENT DOCUMENTS

| | | | |
|---|---|---|---|
| 3,800,878 A | 4/1974 | Poitras | |
| 3,887,991 A | 6/1975 | Panella | |
| 4,628,953 A * | 12/1986 | Correll | B64C 25/36 137/74 |
| 4,715,447 A | 12/1987 | Johnson | |
| 4,744,382 A * | 5/1988 | Visnic | F16K 17/003 137/68.23 |
| 4,893,679 A | 1/1990 | Martin et al. | |
| 5,311,820 A | 5/1994 | Ellingsen | |
| 5,394,803 A | 3/1995 | Mort | |
| 5,398,498 A | 3/1995 | Mort et al. | |
| 5,791,367 A * | 8/1998 | Hackman | F16K 17/383 137/74 |
| 6,866,057 B1 * | 3/2005 | Buehrle, II | F16K 17/383 137/74 |
| 2007/0246233 A1 | 10/2007 | Johnson | |
| 2009/0166359 A1* | 7/2009 | Pisot | F16K 1/306 220/203.29 |
| 2009/0272746 A1* | 11/2009 | Keller | B60K 15/0406 220/295 |
| 2010/0308060 A1* | 12/2010 | Lammers | F16K 1/307 220/582 |
| 2012/0240806 A1 | 9/2012 | Gonsalves et al. | |

* cited by examiner

Primary Examiner — King M Chu
(74) Attorney, Agent, or Firm — Joel G Landau

(57) ABSTRACT

An article includes a vessel, a vent connected to the vessel, and a heat flux-responsive plug disposed in the vent and thermally isolated from the vessel. The heat flux-responsive plug has a material selected based on a phase change characteristic.

5 Claims, 2 Drawing Sheets

PRESSURE-RELIEF VENT

BACKGROUND

This disclosure relates to pressure-relief vents. Vessels that contain pressurized fluid often include a relief valve that opens in response to a predefined pressurization condition in the vessel. While useful in practice, such valves can complicate testing and qualification of the vessel to meet minimum performance standards. For example, a vessel can be pressurized under controlled test conditions to ensure that it meets a given standard. However, since the valve is designed to open at a much lower pressure than the standard pressure against which the vessel is tested, the valve may be activated or compromised during the test, and also frustrate the objective of the testing.

SUMMARY

An article according to an example of the present disclosure includes a vessel, a vent connected to the vessel, and a heat flux-responsive plug disposed in the vent and thermally isolated from the vessel. The heat flux-responsive plug has a material selected based on a phase change characteristic.

A further embodiment of any of the foregoing embodiments includes the heat flux-responsive plug sealing the vent in a solid phase, and not sealing the vent in a liquid phase.

In a further embodiment of any of the foregoing embodiments, the plug selectively opens the vent based on a selected temperature and a selected heat flux.

In a further embodiment of any of the foregoing embodiments, the material is selected based on a high pressure operating environment.

In a further embodiment of any of the foregoing embodiments, the high pressure operating environment has a pressure of at least approximately 2500 pounds per square inch gauge.

In a further embodiment of any of the foregoing embodiments, the material includes a eutectic alloy.

In a further embodiment of any of the foregoing embodiments, the vent includes a stem that extends from a base to a free end, with an enlarged head forming the free end.

In a further embodiment of any of the foregoing embodiments, the stem includes a vent passage, and the vent passage splits into branch passages in the enlarged head.

In a further embodiment of any of the foregoing embodiments, the stem includes, relative to the enlarged head, a narrow shank that extends from the base to the enlarged head.

In a further embodiment of any of the foregoing embodiments, the narrow shank has a length from the base to the enlarged head and a maximum dimension in a direction transverse to the length such that a ratio of the length to the maximum dimension is greater than one.

In a further embodiment of any of the foregoing embodiments, the vent includes a vent passage that extends from an inlet to an outlet, with the heat flux-responsive plug sealing the vent passage with respect to the inlet and the outlet.

In a further embodiment of any of the foregoing embodiments, the vent passage splits into branch passages, and the heat flux-responsive plug is at least partially in the branch passages.

In a further embodiment of any of the foregoing embodiments, the vent passage includes a surface in contact with the heat flux-responsive plug, the surface having a greater roughness than another surface of the vent passage that is not in contact with the heat flux-responsive plug.

In a further embodiment of any of the foregoing embodiments, the vent passage includes a surface in contact with the heat flux-responsive plug, the surface including a controlled-geometry anchor interlocking with the heat flux-responsive plug.

In a further embodiment of any of the foregoing embodiments, the stem is formed from a metallic material selected from the group consisting of aluminum, iron, nickel, and titanium.

An article according to an example of the present disclosure includes a stem including a vent passage extending there through from an inlet at a first end of the stem to an outlet at a second end of the stem, and a plug in the vent passage and sealing the vent passage with respect to the inlet and the outlet, wherein the stem includes a thermal conductance insulator thermally isolating the temperature-responsive plug from the first end.

In a further embodiment of any of the foregoing embodiments, the stem extends from a base to a free end, with an enlarged head forming the free end.

In a further embodiment of any of the foregoing embodiments, the vent passage splits into branch passages in the enlarged head.

In a further embodiment of any of the foregoing embodiments, the plug is at least partially in the branch passages.

In a further embodiment of any of the foregoing embodiments, the stem includes, relative to the enlarged head, a narrow shank that extends from the enlarged head to the base. The narrow shank serves as the thermal conductance insulator.

In a further embodiment of any of the foregoing embodiments, the narrow shank has a length from the base to the enlarged head and a maximum dimension in a direction transverse to the length such that a ratio of the length to the maximum dimension is greater than one.

In a further embodiment of any of the foregoing embodiments, the vent passage includes a surface in contact with the plug. The surface has a greater roughness than another surface of the vent passage that is not in contact with the plug.

In a further embodiment of any of the foregoing embodiments, the vent passage includes a surface in contact with the plug. The surface includes a controlled-geometry anchor interlocking with the plug.

In a further embodiment of any of the foregoing embodiments, the plug includes a eutectic alloy.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
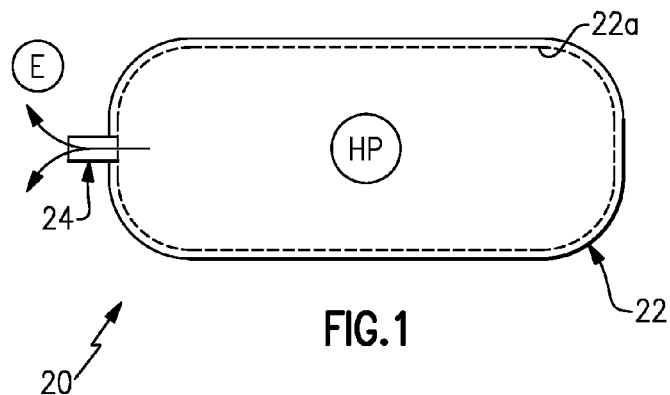
FIG. 1 illustrates an example article having a pressure-relief vent.

FIG. 1 illustrates an example article 20 that includes a vessel 22 and a pressure-relief vent 24 (hereafter "vent 24").

The vessel 22 includes an interior chamber 22a, which in this example is enclosed within the vessel 22 and contains a high-pressure operating environment (represented at "HP" in FIG. 1). While examples herein may be described in the context of a closed vessel, it is to be appreciated that this disclosure can also be applied to "open" system vessels that retain or convey a pressurized fluid, such as pipelines and the like that may be interconnected with other vessels or hardware.

The vent 24 is configured to selectively open the interior chamber 22a to an exterior environment (represented at "E" in FIG. 1) around the vessel 22 in response to a target temperature and heat flux of the exterior environment. For example, if the temperature of the exterior environment increases, the temperature of the vent 24 will also increase. Upon reaching the target temperature, the vent 24 opens to release the pressurized fluid from the interior chamber 22a.

The vent 24 is thermally isolated from the vessel 22 such that the vent 24 has a greater temperature-responsiveness to the exterior environment than to the vessel 22. For example, a vent or valve that is pressure-responsive will have a delayed response to a high temperature environment condition. For such a valve to release, the environment heats the vessel and the fluid in the vessel. The pressure of the fluid increases as the temperature of the fluid increases. Once the pressure reaches the threshold, the valve releases. Thus, the release is time-dependent on the heating, heat flux, and heat transfer properties of the vessel and the fluid. Similarly, a temperature-responsive vent or valve that relies on the temperature of the fluid in the vessel would also have a delayed response.

The vent 24 is thermally isolated from the vessel 22. Therefore, thermal transfer, i.e., heat flux, from the external environment is predominantly responsible for heating of the vent 24. That is, for a given temperature increase of the external environment, a majority of the heat transferred to the vent 24 to raise the temperature of the vent 24 to the environment temperature is convective heat from the external environment rather than conductive heat transferred though the vessel 22 to the vent 24. The vent 24 can therefore rapidly respond to an increase in the temperature of the external environment.

Figure 2:
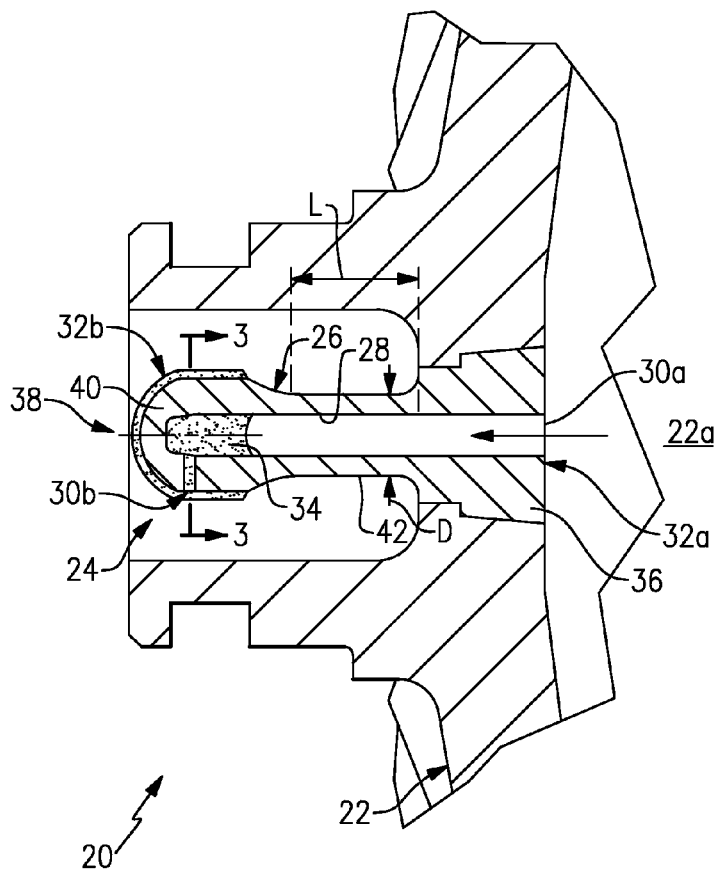
FIG. 2 illustrates an example pressure-relief vent.

FIG. 2 illustrates a cross-section of the vent 24 and a portion of the vessel 22. In this example, the vent 24 includes a stem 26 that has a vent passage 28. The vent passage 28 extends from an inlet 30a to an outlet 30b. The inlet 30a is located in a first end 32a of the stem 26 and opens at the interior chamber 22a. The outlet 30b is located in a second end 32b of the stem 26 and opens to the external environment.

A heat-flux responsive plug 34 (hereafter "plug 34") is located in at least a portion of the vent passage 28 of the vent 24. The plug 34 seals the vent passage 28 with respect to the inlet 30a and the outlet 30b. The term "heat-flux responsive" refers to the plug 34 being responsive to heat-flux with respect to sealing/not sealing the vent passage 28. The term "seal" or variations thereof refers to the plug 34 providing a gas-tight barrier. In one example, the plug 34 is formed of a eutectic alloy. The eutectic alloy has phase change characteristics such that it is solid below the target temperature and melts above the target temperature. The phase change characteristic is thus the melt temperature of the eutectic alloy, although such characteristics are not limited to melt temperatures. A phase change characteristic can be any characteristic directly associated with a phase change, such as but not limited to phase change temperature, phase volume, and composition. In the example of melting, the liquid alloy flows and opens the vent passage 28 for escape of the pressurized fluid from the interior chamber 22a into the external environment. Thus, the plug 34 seals the vent passage 28 when in a first phase (e.g., solid) and does not seal the vent passage 28 when in a second phase (e.g., liquid). The composition of the eutectic alloy, and thus its phase change, can be selected with respect to a desired target temperature and selected heat flux. In this regard, the operation of the vent 24 with respect to the plug 34 is passive in that the plug responds to the temperature and heat flux conditions free from outside activation, such as electrical activation.

The stem 26 extends from a base 36 that is connected to the vessel 22 to a free end 38 that is formed as an enlarged head 40. The base 36 can be secured to the vessel 22 by welding or the like, but is not limited to this joining technique. Relative to the enlarged head 40, the stem 26 also includes a narrow shank 42 that extends from the base 36 to the enlarged head 40.

The stem 26 can be made of a metallic material. For example, the metallic material includes aluminum, iron, nickel, titanium, combinations thereof, or base alloys thereof. The composition of the stem 26 can be selected in correspondence with the composition of the eutectic material of the plug 34 such that there is adherence between the plug 34 and the surfaces of the vent passage 28 of the stem 26.

The narrow shank 42 serves as a thermal conductance insulator that thermally isolates the plug 34 from the vessel 22. For example, the narrow shank 42 provides a relatively small cross-sectional area for thermal conductance from the vessel 22 and fluid within the vessel 22. The plug 34 therefore has a greater temperature-responsiveness and heat-flux-responsiveness to the exterior environment than to the temperature and heat flux from the vessel 22 and/or fluid within the vessel 22.

A further representation of the thermal isolation can be represented by a ratio related to the geometry of the narrow shank 42. For example, the narrow shank 42 has a length, L, from the base 36 to the enlarged head 40, and a maximum dimension, D, in a direction transverse to the length. The ratio of the length to the maximum dimension is greater than one to ensure that the plug 34 is thermally isolated from the vessel 22 and fluid within the vessel. For example, the ratio of greater than one is a representation that the narrow shank 42 is longer than it is wide. Thus, the geometry of the narrow shank 42 restricts thermal conductance from the vessel 22 to the plug 34 because the shank provides a relatively long conduction path and relatively small conduction cross-sectional area.

As shown in FIG. 2, the plug 34 is located mainly within the vent passage 28. However, additional eutectic material can cover at least a portion of the exterior surfaces of the enlarged head 40 to facilitate anchoring the plug 34 with respect to the stem 26. The size and geometry of the vent passage 28 can be selected with respect to desired escape characteristics of the fluid within the interior chamber 22a, as well as the ability of the plug 34 to remain anchored in the vent passage 28 when the vessel 22 is pressurized.

Figure 3:
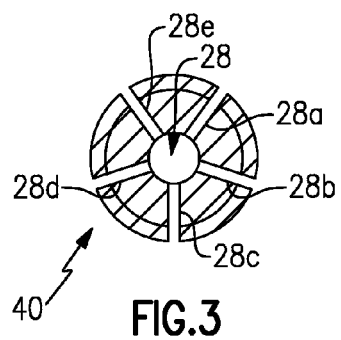
FIG. 3 illustrates a cross-section through an enlarged head of a stem of a pressure-relief vent.

FIG. 3 illustrates a cross-section taken according to the section line in FIG. 2 through the enlarged head 40. In this example, the vent passage 28 splits within the enlarged head 40 into a plurality of branch passages 28a, 28b, 28c, 28d, and 28e that can be individually smaller in cross-section than the main portion of the vent passage 28. The branch passages 28a-e extend radially from the main portion of the vent passage 28 and are circumferentially spaced there around. As can be appreciated, the number, location, and geometry of the branch passages 28a-e can be varied in accordance with a desired rate of escape of the fluid within the interior chamber 22a.

The branch passages 28a-e and the enlarged head 40 facilitate the anchoring of the plug 34. When the vessel 22 is pressurized with fluid, the plug 34 is exposed to pressure forces on at least one side from the fluid within the interior chamber 22a. The pressure forces can cause creep in the plug 34 and deflection of the stem 26. Thus, the plug 34 is securely anchored in the vent passage 28 to reduce or mitigate creep. In this regard, at least a portion of the plug 34 can be located within the branch passages 28a-e as an anchoring mechanism. Further, the eutectic material of the plug 34 can be selected with respect to the pressure forces and high-pressure operating environment, such that strength, creep, or other mechanical properties meet performance criteria.

The enlarged head 40 serves as a stiffening feature. For example, the pressurized fluid of the high-pressure operating environment can exert a substantial amount of force on the plug 34 and stem 26. In one example, the high-pressure operating environment has a pressure of at least approximately 2500 pounds per square inch gauge. These forces can deflect the stem 26. However, the relatively thicker walls of the enlarged head 40 provide a greater stiffness and thus a resistance to deflection. The stiffness reduces leak paths that could potentially form from deflection and thus enhances sealing.

Figure 4:
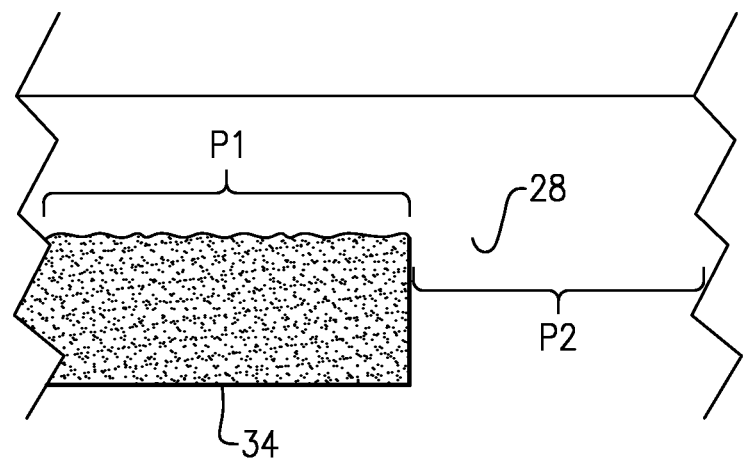
FIG. 4 illustrates a portion of a vent passage that has a surface roughness for mechanical interlocking with a plug.

FIG. 4 illustrates a further example showing a surface portion P1 of the vent passage 28 that is in contact with the plug 34 as a well as a surface portion P2 that is not in contact with the plug 34. In this example, the surface portion P1 that is in contact with the plug 34 has a greater surface roughness than the surface portion P2 that is not in contact with the plug 34.

Figure 5:
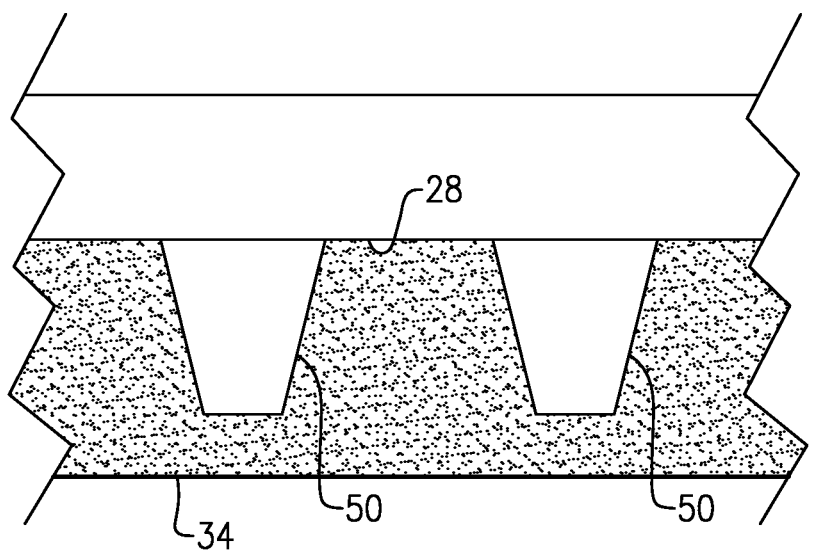
FIG. 5 illustrates a portion of an example vent passage that has one or more controlled-geometry anchors for mechanically interlocking with a plug.

FIG. 5 illustrates a further example showing a portion of the vent passage 28 that is in contact with the plug 34. In this example, the surface of the vent passage 28 includes one or more controlled-geometry anchors 50 that project into the vent passage 28 and interlock with the plug 34. The mechanical interlock between the anchors 50 and the plug 34 facilitate the resistance of movement or creep of the plug 34 and thus enhance durability.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. An article comprising:
   a vessel;
   a vent connected to the vessel; and
   a heat flux-responsive plug disposed in the vent and thermally isolated from the vessel, the heat flux-responsive plug having a material selected based on a phase change characteristic,
   wherein the vent includes a vent passage that extends from an inlet to an outlet, with the heat flux-responsive plug sealing the vent passage with respect to the inlet and the outlet,
   wherein the vent passage includes a surface in contact with the heat flux-responsive plug, the surface having a greater roughness than another surface of the vent passage that is not in contact with the heat flux-responsive plug.

2. The article as recited in claim 1, wherein the vent passage splits into branch passages, and the heat flux-responsive plug is at least partially in the branch passages.

3. The article as recited in claim 1, wherein the vent passage includes a surface in contact with the heat flux-responsive plug, the surface including a controlled-geometry anchor interlocking with the heat flux-responsive plug.

4. The article as recited in claim 1, wherein the stem is formed from a metallic material selected from the group consisting of aluminum, iron, nickel, and titanium.

5. An article comprising:
   a stem including a vent passage extending there through from an inlet at a first end of the stem to an outlet at a second end of the stem; and
   a plug in the vent passage and sealing the vent passage with respect to the inlet and the outlet, wherein the stem includes a thermal conductance insulator thermally isolating the temperature-responsive plug from the first end,
   wherein the vent passage include a surface in contact with the plug, the surface having a greater roughness than another surface of the vent passage that is not in contact with the plug.

* * * * *